US007903290B2

(12) United States Patent
Faken et al.

(10) Patent No.: US 7,903,290 B2
(45) Date of Patent: Mar. 8, 2011

(54) PRINTING METHOD WITH CAMOUFLAGE OF DEFECTIVE PRINT ELEMENTS

(75) Inventors: Henry Faken, Venlo (NL); Johannes C. G. Vestjens, Venlo (NL)

(73) Assignee: Oce-Technologies B.V., Venlo (NL)

( * ) Notice: Subject to any disclaimer, the term of this patent is extended or adjusted under 35 U.S.C. 154(b) by 1184 days.

(21) Appl. No.: 11/121,108

(22) Filed: May 4, 2005

(65) Prior Publication Data

US 2005/0259296 A1 Nov. 24, 2005

(30) Foreign Application Priority Data

May 6, 2004 (EP) .................................... 04076347

(51) Int. Cl.
*G06K 15/00* (2006.01)

(52) U.S. Cl. ........... 358/3.03; 358/3.06; 358/502; 347/8; 347/9; 347/20; 347/37; 347/47

(58) Field of Classification Search ........ 358/3.03–3.06, 358/1.7–1.9, 502; 347/19, 171
See application file for complete search history.

(56) References Cited

U.S. PATENT DOCUMENTS

| | | | | |
|---|---|---|---|---|
| 6,215,557 | B1 | 4/2001 | Owens | |
| 6,428,139 | B1 * | 8/2002 | Silverbrook | 347/19 |
| 6,443,548 | B1 * | 9/2002 | Takayama et al. | 347/14 |
| 6,511,146 | B2 * | 1/2003 | Ishikawa et al. | 347/15 |
| 6,525,838 | B1 * | 2/2003 | Nagae et al. | 358/3.01 |
| 6,532,026 | B2 * | 3/2003 | Takahashi et al. | 347/41 |
| 6,565,180 | B2 * | 5/2003 | Yu et al. | 347/19 |
| 6,575,549 | B1 * | 6/2003 | Silverbrook | 347/19 |
| 6,764,156 | B2 * | 7/2004 | Mantell | 347/14 |
| 6,863,361 | B2 * | 3/2005 | Barr et al. | 347/19 |
| 7,085,002 | B2 * | 8/2006 | Ilbery et al. | 358/1.8 |
| 7,362,473 | B2 * | 4/2008 | Kakutani | 358/3.04 |
| 7,369,276 | B2 * | 5/2008 | Couwenhoven et al. | 358/3.03 |
| 7,570,392 | B2 * | 8/2009 | Takahashi | 358/3.03 |
| 7,581,798 | B2 * | 9/2009 | Arazaki | 347/12 |
| 7,639,402 | B2 * | 12/2009 | Vestjens et al. | 358/3.26 |
| 7,701,614 | B2 * | 4/2010 | Yamazaki | 358/3.03 |
| 2002/0027572 | A1 | 3/2002 | Kato et al. | |
| 2002/0051144 | A1 * | 5/2002 | Ilbery et al. | 358/1.8 |
| 2003/0179410 | A1 * | 9/2003 | Velde | 358/3.03 |
| 2004/0104951 | A1 * | 6/2004 | Shibata et al. | 347/14 |
| 2004/0119766 | A1 * | 6/2004 | Shibata et al. | 347/12 |
| 2004/0174570 | A1 | 9/2004 | Plunkett et al. | |
| 2006/0082848 | A1 * | 4/2006 | Takakura et al. | 358/534 |

FOREIGN PATENT DOCUMENTS

| | | | |
|---|---|---|---|
| EP | 1 157 840 | A2 | 11/2001 |
| JP | 2004284279 | A * | 10/2004 |

* cited by examiner

*Primary Examiner* — Mark K Zimmerman
*Assistant Examiner* — Dung D Tran
(74) *Attorney, Agent, or Firm* — Birch, Stewart, Kolasch & Birch, LLP

(57) ABSTRACT

A printing method is provided for a printer having a printhead with a plurality of print elements and capable of printing a binary pixel image. The method includes locating defective print elements, determining a camouflage area in the vicinity of pixels that would have to be printed with the defective print elements, and camouflaging the defective print elements by modifying image information in the camouflage area, wherein the camouflaging step is incorporated in a halftoning step in which error diffusion is used for creating the binary pixel image, and comprises a step of modifying an error propagation scheme for the camouflage area.

25 Claims, 5 Drawing Sheets

*Fig. 10A*

| | j-3 | j-2 | j-1 | j | j+1 | j+2 |
|---|---|---|---|---|---|---|
| i+2 | 1 | 0 | 0 | 0 | 1 | 0 |
| i+1 | 0 | 0 | 1 | 0 | 0 | 1 |
| i | 0 | 1 | 0 | 1 | 0 | 0 |
| i-1 | 1 | 0 | 0 | 0 | 1 | 0 |
| i-2 | 0 | 0 | 1 | 0 | 1 | 0 |
| i-3 | 0 | 1 | 0 | 0 | 0 | 1 |

*Fig. 10B*

| | j-3 | j-2 | j-1 | j | j+1 | j+2 |
|---|---|---|---|---|---|---|
| i+2 | 1 | 0 | 0 | 0 | 1 | 0 |
| i+1 | 0 | 0 | 255 | 0 | 0 | 255 |
| i | 0 | 255 | 0 | 255 | 0 | 0 |
| i-1 | 255 | 0 | 0 | 0 | 255 | 0 |
| i-2 | 0 | 0 | 1 | 0 | 1 | 0 |
| i-3 | 0 | 1 | 0 | 0 | 0 | 1 |

PRINTING METHOD WITH CAMOUFLAGE OF DEFECTIVE PRINT ELEMENTS

This application claims the priority benefit of European Patent Application No. 04076347.6 filed on May 6, 2004, which is hereby incorporated by reference.

BACKGROUND OF THE INVENTION

1. Field of the Invention

The invention relates to a printing method for a printer having a printhead with a plurality of print elements and capable of printing a binary pixel image. The invention further relates to a printer and to a computer program implementing this method. The invention is applicable, for example, to an ink jet printer the printhead of which comprises a plurality of nozzles as print elements.

2. Discussion of the Background Art

Typically, the nozzles of an ink jet printer are arranged in a line that extends in parallel with the direction (subscanning direction) in which a recording medium, e.g. paper, is transported through the printer, and the printhead scans the paper in a direction (main scanning direction) perpendicular to the subscanning direction. A complete swath of the image is printed in a single pass of the printhead, and then the paper is transported by the width of the swath so as to print the next swath. When a nozzle of the printhead is defective, e.g. has become clogged, the corresponding pixel line is missing in the printed image, so that image information is lost and the quality of the print is degraded.

A printer may also be operated in a multi-pass mode, in which only part of the image information of a swath is printed in a first pass and the missing pixels are filled-in during one or more subsequent passes of the printhead. In this case, it is sometimes possible that a defective nozzle is backed-up by a non-defective nozzle, although the cost of productivity may increase.

U.S. Pat. No. 6,215,557 is directed to a method of the type indicated above, wherein, when a nozzle is defective, the print data are altered so as to bypass the faulty nozzle. This means that a pixel that would have but cannot be printed with the defective nozzle is substituted by printing an extra pixel in one of the neighbouring lines that are printed with non-defective nozzles, so that the average optical density of the image area is conserved and the defect resulting from the nozzle failure is camouflaged and becomes almost imperceptible. This method involves a specific algorithm that operates on a bitmap, which represents the print data, and shifts each pixel that cannot be printed to a neighbouring pixel position. However, if this neighbouring pixel position happens to be occupied by a pixel already printed, anyway, pursuant to the original print data, then the extra pixel cannot be printed, and a loss of image information will nevertheless occur.

SUMMARY OF THE INVENTION

Therefore, it is an object of the invention to provide a printing method in which the camouflage step can be performed more efficiently and is readily integrated in the workflow of the print process.

It is another object of the invention to provide a printing method, apparatus and computer software which overcome the limitations and disadvantages associated with the background art.

According to an aspect of the invention, the camouflaging step is incorporated in a halftoning step, in which error diffusion is used for creating the binary pixel image, and comprises a step of modifying an error propagation scheme for the camouflage area.

The print data of an image to be printed is frequently supplied to the printer in the form of a multi-level pixel matrix, in which the grey level of each individual pixel may vary over a continuous or practically continuous range. For example, the grey level of each pixel may be given by an 8-bit word, i.e. an integral number between 0 and 255, so that 256 different grey levels may be distinguished. However, since the printer is only capable of printing a binary image or bitmap, in which each pixel can only be either printed or not, it is necessary to perform a halftoning step in which the multi-level pixel matrix is transformed into a bitmap with conservation of the average grey level.

A commonly employed halftoning method is an error diffusion process. In this process, the grey level of a pixel that is currently being processed is compared to a predetermined threshold value. When the grey level is larger than the threshold value, the corresponding pixel in the bitmap is made black, the threshold value is subtracted from the grey level, and the rest or error is diffused, i.e. propagated or distributed over a number of target pixels in the vicinity of the source pixel, i.e. the pixel that is being processed. When the grey level of the source pixel is smaller than the threshold value, the corresponding pixel in the bitmap is made white, and the error which is distributed over the target pixels in the like manner is then formed by the whole grey level of the source pixel. In order to distribute the error over the target pixels, the error is multiplied with a specific weight factor for each target pixel. This weight factor depends on the spatial relationship between the source pixel and the target pixel. The grey level of the target pixel is increased by the product of the error and the weight factor. When, later in the process, it is the turn of the target pixel to be processed, the grey level that is compared to the threshold value will thus be larger or smaller than the original grey level of the pixel as specified by the print data. The result of this process is a bitmap in which the average grey level of a small image area is approximately equal to the grey level of the same area in the original multi-level pixel matrix.

An error diffusion process may be characterised by an error propagation scheme which specifies the threshold value to be employed, the selection of target pixels and their weight factors. If a pixel of the bitmap cannot be printed because the corresponding print element of the printer is defective, then, according to the invention, the error propagation scheme for this pixel and/or the pixels in the neighbourhood is modified in order to achieve at least one of the following two objectives: (1) increasing the likelihood that an error from a printable pixel is propagated onto other printable pixels rather than to a non-printable pixel, and (2) avoiding that a non-printable pixel is made black, and, instead, assuring that its image information is treated as an error and is at least partly propagated onto to printable pixels. The first objective can be achieved by increasing the weight factors assigned to printable target pixels. This will lead to the creation of more black pixels in the neighbourhood of the non-printable pixel, so that the image defect is camouflaged to some extent. The second objective can be achieved by increasing the threshold value for the non-printable pixels, possibly to infinity, and thereby increasing the error that is diffused onto neighbouring printable pixels. Again, the result is an increased number of black pixels in the vicinity of the non-printable pixel, and the image defect is camouflaged.

It is one of the main advantages of the present invention that the camouflage procedure does not require an extra processing step but is incorporated in the error diffusion process which needs to be executed anyway in order to create the bitmap. It should be noted that the term "bitmap", as used here, does not mean that a bitmap must actually be stored physically in a storage medium, but only means that the print data are provided in binary form, so that each pixel is represented by a single bit. Thus, the "bitmap" may well be generated "on the fly" during the print process.

The invention further has an advantage that the loss of image information caused by defective print elements can reliably be controlled or even eliminated completely by appropriately adapting the error propagation scheme. Another advantage of the invention is that the method can be carried out at a comparatively early stage in the processing sequence, so that the method can also be adapted, for example, to printer hardware which has no sufficient processing capability for carrying out corrections on bitmap level. It is even possible that the method according to the invention is executed in a host computer from which the print data are sent to the printer, provided that the information on the defective nozzles of the printer is made available at the host computer. Then, if the printer forms part of a multi-user network, the data processing necessary for carrying out the invention may be distributed over a plurality of computers in the network.

The invention may be particularly useful when the print data that are supplied to the printer are in the multi-level format. However, if these data are in the binary format already, it is a simple matter to reconvert these data into multi-level data, with or without averaging over clusters of adjacent pixels, and then to employ the method of the invention as described above.

Preferably, the camouflage area, where a modified error propagation scheme applies, may comprise both the source pixels for which a non-printable pixel is a target pixel, and the target pixels associated with the non-printable pixels. In order to prevent the error diffusion process from becoming recursive, it is common practice that the target pixels are limited to those pixels that are processed later than the respective source pixel. Thus, when the lines of the pixel matrix are processed in the order of increasing line index, and the pixels within each line are processed in the order of increasing column index, a target pixel will always have either a larger line index or a larger column index than the corresponding source pixel. Then, when printing in the single-pass mode, for example the camouflage area will be formed by one or more pixel lines adjacent to the line that is affected by the nozzle failure. For example, the camouflage area may then comprise the two direct neighbours of the line that cannot be printed.

However, the invention is also applicable in multi-pass printing. Then, a nozzle failure will generally not have the effect that a complete line is missing in the printed image, but that, for example in the case of two-pass printing, typically only half the pixels in the line will be missing. In this case, the camouflage area may consist of the remaining, printable pixels in the line in which half of the pixels are missing. Optionally, the camouflage area may also be extended to the adjacent lines.

When the weight factors assigned to printable target pixels sum up to 100%, the image information of the pixel will be conserved completely, except for those cases where the camouflage area becomes saturated with black pixels. In a modified embodiment of the invention, however, it is possible to use an error propagation scheme in which the sum of the weight factors of printable pixels is smaller than 100%, so that a certain loss of image information is admitted. To preserve the frequency of the image information more precise, the threshold value to be employed for the printable pixels in the camouflage area can be decreased. This may have the effect that some of the black pixels that cannot be printed are "shifted" in rearward direction, i.e. in the direction of decreasing line and column indices.

BRIEF DESCRIPTION OF THE DRAWINGS

Preferred embodiments of the invention will now be explained in conjunction with the drawings, in which:

FIGS. 10A and 10B are diagrams of a bitmap and a pixel matrix illustrating the modified embodiment.

DETAILED DESCRIPTION OF THE PREFERRED EMBODIMENTS

Figure 1:
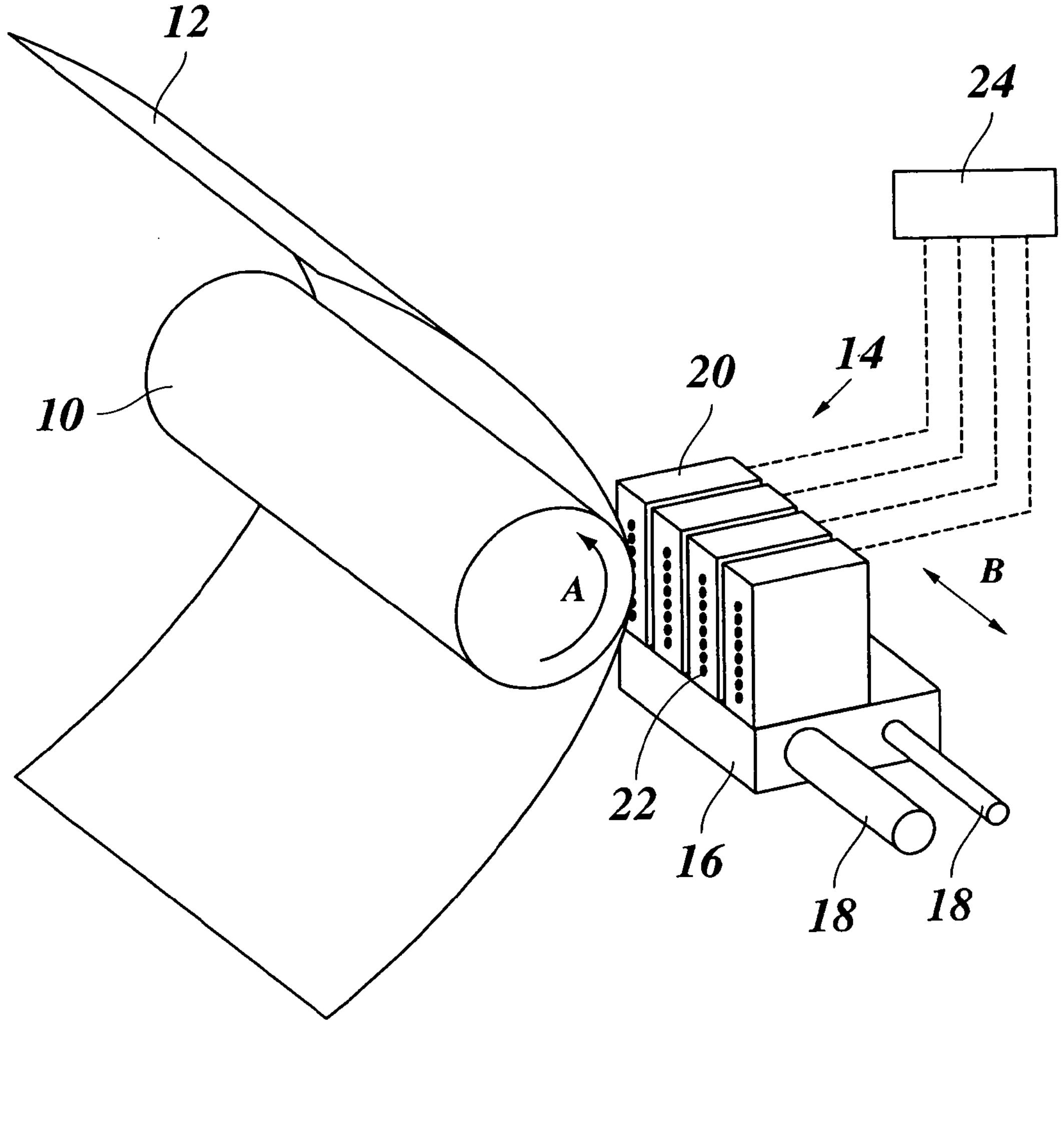
FIG. 1 is a schematic view of an ink jet printer to which the invention is applicable.

As is shown in FIG. 1, an ink jet printer according to an embodiment of the invention comprises a platen 10 which serves for transporting a recording paper 12 in a subscanning direction (arrow A) past a printhead unit 14. The printhead unit 14 is mounted on a carriage 16 that is guided on guide rails 18 and is movable back and forth in a main scanning direction (arrow B) relative to the recording paper 12. In the example shown, the printhead unit 14 comprises four printheads 20, one for each of the basic colours cyan, magenta, yellow and black. Each printhead has a linear array of nozzles 22 extending in the subscanning direction. The nozzles 22 of the printheads 20 can be energized individually to eject ink droplets onto the recording paper 12, thereby to print a pixel on the paper. When the carriage 16 is moved in the direction B across the width of the paper 12, a swath of an image can be printed. The number of pixel lines of the swath corresponds to the number of nozzles 22 of each printhead. When the carriage 16 has completed one pass, the paper 12 is advanced by the width of the swath, so that the next swath can be printed. All the components of the printer are operatively coupled.

The printheads 20 are controlled by a processing unit 24 which processes the print data in a manner that will be described in detail hereinbelow. The discussion will be focused on printing in black colour, but is equivalently valid and applicable for printing in other colours.

Figure 2A:
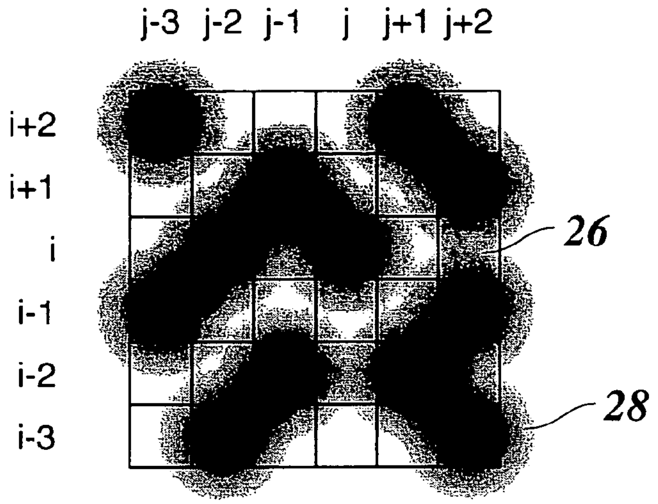
FIGS. 2A-2C are diagrams of an area of 6×6 pixels of an image in various representations, illustrating an example of the effect of a nozzle failure and the camouflage process.

FIG. 2A shows an array of 6×6 pixels 26, which represents a portion of an image to be printed as an example. The pixels 26 are arranged in lines i−3, i−2, i−1, i, i+1, i+2 and columns j−3, j−2, j−1, j. j+1 and j+2. Black pixels are indicated by dots 28 as printed with the ink jet printer shown in FIG. 1. Since the ink droplet forming a dot 28 tends to spread on the recording medium (e.g., paper), the optical density of the dot decreases gradually from the center toward the periphery, and the lighter peripheral portions of the dot extend beyond the area of the pixel, so that neighbouring dots overlap. The image that has been shown in largely magnified scale in FIG. 2A would give the impression of a uniform grey area.

Figure 2B:
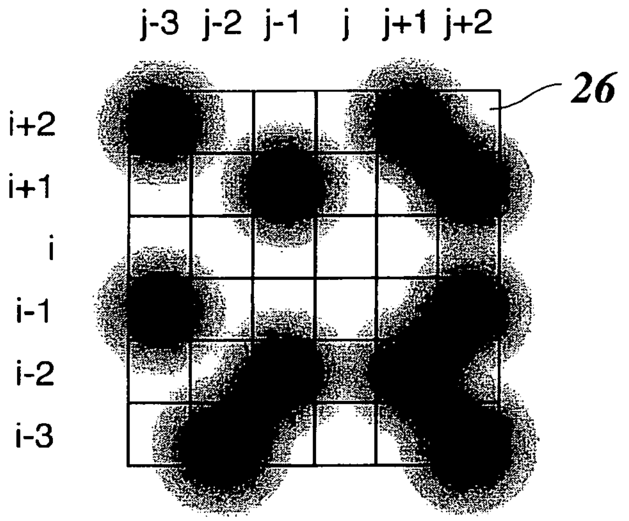

FIG. 2B shows the same image shown in FIG. 2A, except that the nozzle needed for printing the line i is defective, so that the dots at the pixel positions (i, j−2) and (i, j) are missing. This would give rise to a perceptible brighter gap in the printed image at the position of the line i.

Figure 2C:
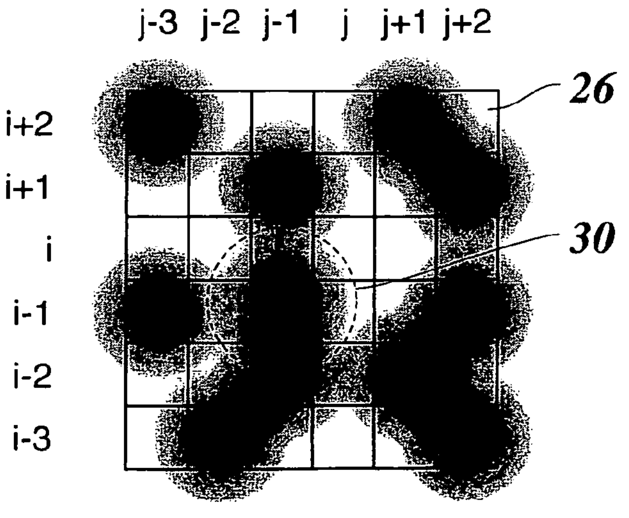

In order to eliminate or at least mitigate this image defect, the processing unit 24 shown in FIG. 1 performs a camouflage step which, in the given example, leads to the insertion of an additional dot 30 (FIG. 2C) at the pixel position (i−1, j−1), i.e. in the pixel line i−1 directly adjacent to the defective line i. As a result, on the macroscopic scale the image shown in FIG. 2C resembles the ideal image shown in FIG. 2A.

Figure 3:
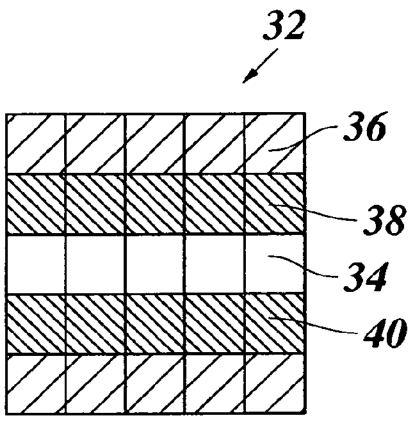
FIG. 3 is a diagram of a 5×5-pixel matrix illustrating the construction of a camouflage area for a single-pass print mode.

This camouflage process of the invention will now be explained in detail. At first, it shall be assumed that the print data are supplied to the printer in a multi-level format, in which the grey value of each pixel is indicated by an 8-bit word, i.e. by an integral number between 0 and 255. The number 0 represents a white pixel and the number 255 a black pixel with maximum optical density. The print data are thus represented by a multi-level pixel matrix 32 as is schematically shown in FIG. 3. In the single-pass mode, each pixel line of this pixel matrix will be printed by only one of the nozzles 22 of the printhead. The printer may be equipped with a detection system which automatically detects and locates defective nozzles. As an alternative, the location of a defective nozzle may also be input by the user. When, for example, the nozzle responsible for printing the third line of the pixel matrix is defective, the pixels in that line are non-printable pixels 34, whereas the other pixels 36, 38 and 40 are printable. Pixels 38 and 40 in the lines directly adjacent to the non-printable pixels 34 are shown in dark hatching in FIG. 3. The non-printable pixels 34 and pixels 38 and 40 adjacent thereto form a camouflage area that is involved in camouflaging the effect of the defective nozzle.

Figure 4:
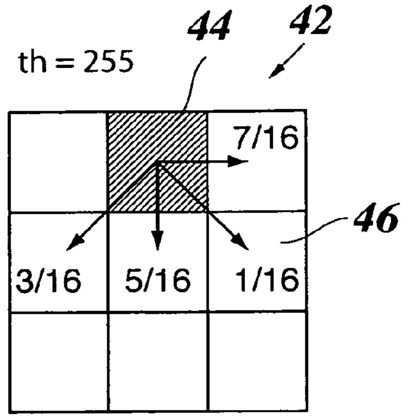
FIG. 4 is a diagram illustrating a general error propagation scheme.

An error propagation halftoning step is used for transforming the multi-level pixel matrix 32 into a bitmap. FIG. 4 illustrates a conventional error propagation scheme 42 (a Floyd Steinberg scheme) that is frequently used for this purpose. As is shown in FIG. 4, a number of arrows originate from a source pixel 44 and point to four target pixels 46 adjacent to the source pixel. The fractions (7/16, etc.) given in the target pixels 46 indicate the weight factors with which the error remaining from the source pixel is distributed over the target pixels. The theshold value 'th' with which the grey level of the source pixel 44 is compared is 255, for example. This standard arrow propagation scheme will be used for the printable pixels 36 outside of the camouflage area.

It is assumed here that the processing of the source pixels proceeds from left to right and from top to bottom. As is indicated by the arrows, the error is propagated only in "forward" direction, i.e. each source pixel is processed earlier than its target pixels.

Figure 5:
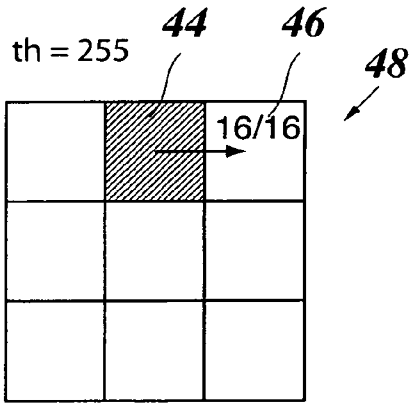
FIGS. 5 and 6 are diagrams illustrating modified error propagation schemes according to an embodiment of the invention.

FIG. 5 illustrates a modified error propagation scheme 48 that will be used for the pixels 38 in the line that is processed immediately before the line including the non-printable pixels 34 according to an embodiment of the invention. Here, the error from the source pixel 44 is propagated with a weight factor of 1 (16/16) only to the next pixel in the same line. Thus, the image information is kept in the line in which it can actually be printed, and the non-printable pixels 34 in the line below are not used as target pixels. The theshold value 'th' for the source pixel 44 is again 255. The large weight factor with which the error is propagated horizontally in FIG. 5 increases the likelihood that additional black pixels are added in this line, in order to achieve a camouflage effect similar to the one shown in FIG. 2C.

Figure 6:
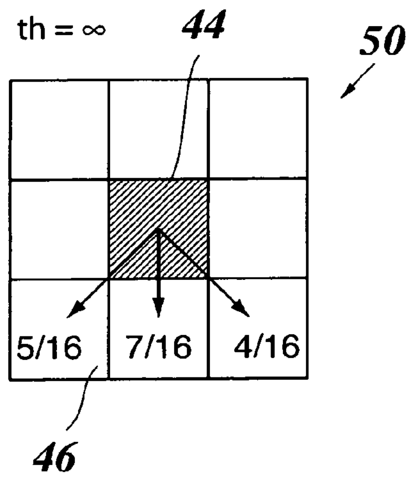

FIG. 6 shows another modified error propagation scheme 50 that will be used for the non-printable pixels 34 in FIG. 3. Here, the error from the (non-printable) target pixel 44 is propagated only into the line below, i.e. the line formed by the pixels 40 in FIG. 3. The sum of the weight factors is again equal to 1, so that the error is fully transferred onto the neighbouring line. Moreover, in this scheme, the threshold value for the non-printable pixels 34 is increased to a level above 255. In other words, even when the grey level of such a pixel is equal to 255, the pixel will nevertheless be made white and the error of 255 will be propagated to the line below. Thus, the image information of the line that cannot be printed because of the nozzle defect will be fully transferred to the line immediately therebelow. Again, this increases the likelihood that one of the pixels 40 in FIG. 3 will be made black in order to camouflage the nozzle defect. The pixels 40 form part of the camouflage area because they are affected by the error propagation scheme 50 shown in FIG. 6. However, when the pixels 40 are themselves processed in the error diffusion process, the standard error propagation scheme 42 of FIG. 4 may be used.

In the example given above, it has been assumed that the threshold value utilized in the error diffusion process is either 255 (for the error propagation schemes 42 and 48) or infinity (for the scheme 50). In a modified embodiment of the invention, however, it would be possible to use a somewhat lower threshold value for the pixels 38 and/or 40, in order to further increase the likelihood of black pixels being created. Optionally, in order to avoid an over-compensation, it is possible that the weight factors indicated in FIG. 6 are reduced correspondingly. This modified embodiment would have the effect that the likelihood of becoming black is increased for the pixels 38 (above the line of the nozzle defect) and decreased for the pixels 40 (the line below the nozzle defect).

With the error propagation schemes of FIGS. 4 to 6, the target pixels 46 are not more than one line or column away from the source pixel 44. In a modified scheme, the maximum distance between source and target pixel may be larger, e. g. 2. Then, the camouflage area would also include the first and the fifth line in FIG. 3.

Figure 7:
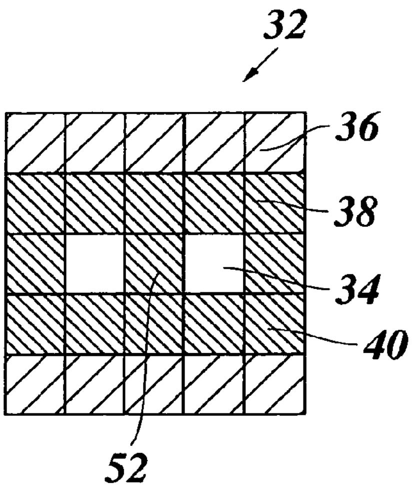
FIG. 7 is a diagram of a 5×5-pixel matrix illustrating the construction of a camouflage area for a specific two-pass print mode.

FIG. 7 illustrates the case of a specific two-pass print mode. When one of the two nozzles responsible for printing the third line in the pixel matrix 32 in FIG. 7 is defective, only every second pixel in that line will be a non-printable pixel 34, and the intervening pixels 52 will belong to the camouflage area. In the error diffusion process according to the invention, the pixel 52 will be treated with an error propagation scheme in which the error is only propagated downward but not horizontally. For the non-printable pixels 34 the error may be propagated horizontally (as in FIG. 5) and/or downwardly. In case of the pixels 38, two different error propagations schemes have to be used, depending upon whether or not the pixel is located directly above a non-printable pixel 34.

The camouflage process described above is particularly efficient for images which mainly contain small or medium grey levels. In case of very dark images and, in the extreme, in the case of solid black areas, it is increasingly difficult or even impossible to add more black pixels in the camouflage area. Nevertheless, the camouflage process may be useful even for dark or black images, depending upon the design of the printer. Some known printers are capable of printing a plainly black area even when the percentage of black pixels in the bitmap is somewhat smaller than 100%. In this case, the modified error propagation schemes for the camouflage area may lead to an over-saturated bitmap which would still mask the nozzle defect to some extent.

Figure 8:
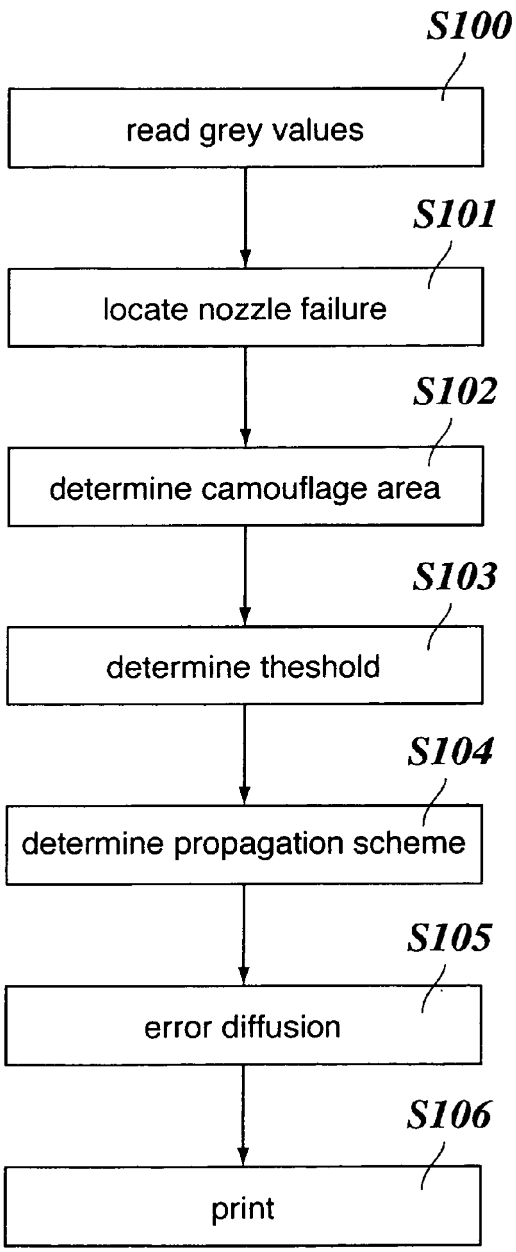
FIG. 8 is a flow diagram illustrating an embodiment of the method according to the invention.

A specific embodiment of the method according to the invention will now be described by reference to the flow diagram shown in FIG. 8. In step S100, the multi-level pixel matrix 32 is established by reading-in the grey values of the pixels. The pixel lines that are affected by nozzle failures of the printhead are identified in step S101. Then, in step S102, the camouflage area is determined. An optional step S103 may involve a decrease of the threshold value 'th', e. g. from 255 to 191, for the lines (pixel 38 in FIG. 3) preceding the lines affected by the defect. Step S104 identifies the pixels (such as the pixels 34 and 38 in FIG. 3) for which a modified error propagation scheme (50 or 48) has to be employed and selects the appropriate scheme. In step S105, the error diffusion process is performed for all the pixels of the pixel matrix with either the non-modified or the selected one of the modified error propagation schemes. The resulting bitmap is then printed in step S106.

Alternatively, the step S100 may be performed after the step S101 or even after the step S104.

Figure 9:
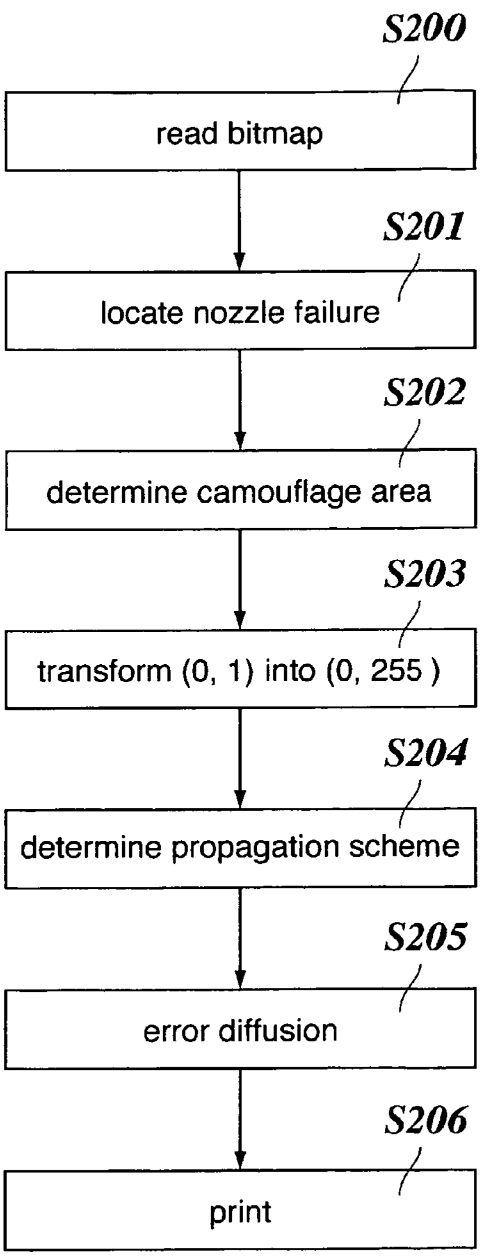
FIG. 9 is a flow diagram for a modified embodiment of the invention.

FIG. 9 illustrates another embodiment which is adapted to the case that the print data are presented already in the format of a bitmap, i.e. a matrix of only black and white pixels. The bitmap is read in step S200. The steps S201 and S202 correspond respectively to the steps S101 and S102 discussed above. In step S203, the part of the bitmap which corresponds to the camouflage area is reconverted into a multi-level pixel matrix. To this end, a value of 255 is assigned to each of the black pixels of the pixel matrix, i.e. the pixels having the binary value 1, and the white 0-pixels are left as they are. All non-printable pixels 34 may be set to 0. The steps S204, S205 and S206 correspond again respectively to the steps S104, S105 and S106, with the difference that steps S204 and S205 are performed only for the camouflage area and for the lines that contain the corresponding target pixels.

FIG. 10A shows an example of the bitmap read in step S200 of FIG. 9. Again, it is assumed that the nozzle that is responsible for printing the pixels in line i in the single-pass mode is defective. FIG. 10B illustrates the corresponding multi-level pixel matrix obtained in step S203 of FIG. 9.

The embodiment of FIG. 9 has been exemplified for the single-pass mode, but it goes without saying that this method is also applicable to a multi-pass mode, as has been described in conjunction with FIG. 7.

The processing steps of the methods of the present invention are implementable using existing computer programming language in, e.g., the processing unit 24 of FIG. 1. Such computer program(s) may be stored in memories such as RAM, ROM, PROM, etc. associated with computers and/or printers. Alternatively, such computer program(s) may be stored in a different storage medium such as a magnetic disc, optical disc, magneto-optical disc, etc. The computer programs are readable using a known computer or computer-based device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A printing method for a printer having a printhead with a plurality of print elements and capable of printing a binary pixel image, the method comprising the steps of:

using a processing unit to perform the following steps:

locating defective print elements;

determining a camouflage area in the vicinity of pixels that would have to be printed with the defective print elements;

halftoning the image information, in which error diffusion by an error propagation scheme is used for creating the binary pixel image; and in the halftoning step, applying the error diffusion by a first error propagation scheme outside the camouflaging area and applying the error diffusion by a second error propagation scheme within the camouflage area different from the first error propagation scheme so as to camouflage the defective elements.

2. The method of claim 1, wherein the error is propagated with an increased weight factor to printable pixels in the camouflage area and with a reduced weight factor or not at all to non-printable pixels.

3. The method of claim 2, wherein the sum of the weight factors with which the error is propagated to the printable pixels is equal to 1.

4. The method of claim 2, wherein different error diffusion thresholds (th) are used inside and outside of the camouflage area.

5. The method of claim 1, wherein the image information of non-printable pixels is treated as an error and is propagated to printable pixels in the camouflage area.

6. The method of claim 1, wherein when a single-pass print mode is employed by the printer, the different error propagation scheme is used for pixels in a line that is processed immediately before a line of non-printable pixels, the different error propagation scheme being adapted to propagate the error only within the same line.

7. The method of claim 1, wherein when a multi-pass print mode is employed by the printer, the different error propagation scheme is used for pixels in a line that is processed immediately before a line of non-printable pixels, the different error propagation scheme being adapted to propagate the error only within the same line or in pixels in a next line that are printed with non-defective nozzles.

8. The method of claim 1, wherein when a single-pass print mode is employed by the printer, the different error propagation scheme is used for non-printable pixels, the different error propagation scheme being arranged such that the error is propagated only onto pixels in the same line but printed by non-defective nozzles in the subsequent line or in a line subsequent to the line of the non-printable pixels.

9. The method of claim 1, wherein print data are received in the form of a first binary pixel image and are converted into a multi-level pixel matrix before the halftoning and camouflaging steps are carried out.

10. A printer for printing a binary pixel image, the printer comprising:

a printhead including a plurality of print elements; and a processing unit configured to locate defective print elements among the print elements of the printhead, determine a camouflage area in the vicinity of pixels that would have to be printed with the defective print elements, halftone the image information, in which error diffusion by an error propagation scheme is used for creating the binary pixel image, and when halftoning the image information, apply the error diffusion by a first error propagation scheme outside the camouflaging area and apply the error diffusion by a second error propagation scheme within the camouflage area different from the first error propagation scheme so as to camouflage the defective elements.

11. The printer of claim 10, wherein the error is propagated with an increased weight factor to printable pixels in the camouflage area and with a reduced weight factor or not at all to non-printable pixels.

12. The printer of claim 11, wherein the sum of the weight factors with which the error is propagated to the printable pixels is equal to 1.

13. The printer of claim 11, wherein different error diffusion thresholds (th) are used inside and outside of the camouflage area.

14. The printer of claim 10, wherein the processing unit is configured to treat the image information of non-printable pixels as an error and propagate the image information to printable pixels in the camouflage area.

15. The printer of claim 10, wherein when a single-pass print mode is employed by the printer, the processing unit is configured to use the different error propagation scheme for pixels in a line that is processed immediately before a line of non-printable pixels, the different error propagation scheme being adapted to propagate the error only within the same line.

16. The printer of claim 10, wherein when a multi-pass print mode is employed by the printer, the processing unit is configured to use the different error propagation scheme for pixels in a line that is processed immediately before a line of non- printable pixels, the different error propagation scheme being adapted to propagate the error only within the same line or in pixels in a next line that are printed with non-defective nozzles.

17. The printer of claim 10, wherein when a single-pass print mode is employed by the printer, the processing unit is configured to use the different error propagation scheme for non-printable pixels, the different error propagation scheme being arranged such that the error is propagated only onto pixels in the same line but printed by non-defective nozzles in the subsequent line or in a line subsequent to the line of the non-printable pixels.

18. A computer program product embodied on at least one non-transitory computer-readable medium associated with a printer having a printhead with a plurality of print elements, the product comprising computer-executable instructions:

locating defective print elements;

determining a camouflage area in the vicinity of pixels that would have to be printed with the defective print elements;

halftoning the image information, in which error diffusion by an error propagation scheme is used for creating the binary pixel image; and in the halftoning step, applying the error diffusion by a first error propagation scheme outside the camouflaging area and applying a second error propagation scheme within the camouflage area different from the first error propagation scheme so as to camouflage the defective elements.

19. The computer program product of claim 18, wherein the error is propagated with an increased weight factor to printable pixels in the camouflage area and with a reduced weight factor or not at all to non-printable pixels.

20. The computer program product of claim 19, wherein the sum of the weight factors with which the error is propagated to the printable pixels is equal to 1.

21. The computer program product of claim 19, wherein different error diffusion thresholds (th) are used inside and outside of the camouflage area.

22. The computer program product of claim 18, wherein the image information of non-printable pixels is always treated as an error and is propagated to printable pixels in the camouflage area.

23. The computer program product of claim 18, wherein when a single-pass print mode is employed by the printer, the different error propagation scheme is used for pixels in a line that is processed immediately before a line of non-printable pixels, the different error propagation scheme being adapted to propagate the error only within the same line.

24. The computer program product of claim 18, wherein when a multi-pass print mode is employed by the printer, the different error propagation scheme is used for pixels in a line that is processed immediately before a line of non-printable pixels, the different error propagation scheme being adapted to propagate the error only within the same line or in pixels in a next line that are printed with non-defective nozzles.

25. The computer program product of claim 18, wherein when a single-pass print mode is employed by the printer, the different error propagation scheme is used for non-printable pixels, the at least one second error propagation scheme being arranged such that the error is propagated only onto pixels in the same line but printed by non-defective nozzles in the subsequent line or in a line subsequent to the line of the non-printable pixels.

* * * * *